(12) United States Patent
Suzuki et al.

(10) Patent No.: US 12,730,829 B2
(45) Date of Patent: Sep. 8, 2026

(54) RECORDING MEDIUM, DATA GATHERING APPARATUS, AND METHOD FOR GATHERING DATA

(71) Applicant: Fujitsu Limited, Kawasaki (JP)

(72) Inventors: Kanata Suzuki, Kawasaki (JP); Taro Sunagawa, Kawasaki (JP); Tomotake Sasaki, Kawasaki (JP); Takashi Katoh, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

(21) Appl. No.: 18/610,415

(22) Filed: Mar. 20, 2024

(65) Prior Publication Data

US 2024/0232231 A1 Jul. 11, 2024

Related U.S. Application Data

(63) Continuation of application No. PCT/JP2021/035083, filed on Sep. 24, 2021.

(51) Int. Cl.

*G06F 16/28* (2019.01)
*G06F 18/214* (2023.01)
*G06N 20/00* (2019.01)

(52) U.S. Cl.

CPC .......... *G06F 16/285* (2019.01); *G06F 18/214* (2023.01); *G06N 20/00* (2019.01)

(58) Field of Classification Search

CPC ...... G06F 16/285; G06F 18/214; G06F 18/24; G06F 18/213; G06F 16/45; G06F 16/55;

(Continued)

(56) References Cited

U.S. PATENT DOCUMENTS 10,456,915 B1 * 10/2019 Diankov .................. G06T 7/73
2017/0032285 A1 2/2017 Sharma et al.

(Continued)

FOREIGN PATENT DOCUMENTS

JP 2009211294 A * 9/2009
JP 2017-520864 7/2017

(Continued)

OTHER PUBLICATIONS

JPOA—Office Action of Japanese Patent Application No. 2023-549254 dated Jan. 28, 2025, with relevant machine translation [4 pages]. ** References cited in the JPOA were previously submitted in the IDS filed on Mar. 20, 2024.

(Continued)

*Primary Examiner* — Evan Aspinwall
(74) *Attorney, Agent, or Firm* — Fujitsu Intellectual Property Center

(57) ABSTRACT

A non-transitory computer-readable recording medium has stored therein a data gathering program executable by one or more computers, the data gathering program including: performing data augmentation on unlabeled data; providing a specification label to a group of augmented data pieces generated by the data augmentation, the specification label indicating that labels of the augmented data pieces all match; and providing, when a label for one data piece of the augmented data pieces is determined, the label to one or more data pieces each provided with a specification label that is same as a specification label of the one data piece.

9 Claims, 24 Drawing Sheets

(58) Field of Classification Search
CPC ........ G06F 16/75; G06F 16/906; G06F 18/23; G06N 20/00; G06N 3/09; G06N 3/08
USPC .......................................................... 707/738
See application file for complete search history.

(56) References Cited

U.S. PATENT DOCUMENTS

2017/0286773 A1* 10/2017 Skaff ...................... G06N 3/008
2019/0099892 A1 4/2019 Namiki
2019/0324537 A1 10/2019 Kaji et al.
2020/0094406 A1* 3/2020 Kusano .................. B25J 9/1669
2020/0151692 A1* 5/2020 Gao ..................... G07G 1/0063
2020/0241574 A1* 7/2020 Lin ...................... G05D 1/0088
2020/0338722 A1* 10/2020 Jang ..................... G06N 3/0464
2020/0380302 A1* 12/2020 Nakazawa .......... G06F 18/2148
2021/0042330 A1* 2/2021 Bremer .................. G06N 20/20
2021/0097348 A1* 4/2021 Shlens ................... G06N 20/00
2021/0158101 A1* 5/2021 Shinzaki ................. G06F 18/41
2021/0192394 A1* 6/2021 McKay .................. G06N 3/091
2021/0279960 A1 9/2021 Fukuma et al.
2021/0334706 A1* 10/2021 Yamaguchi ............ G06N 20/00
2022/0254107 A1 8/2022 Fukuma et al.
2022/0335085 A1* 10/2022 Tsukatani .............. G06F 16/906
2023/0028237 A1* 1/2023 Wei ...................... G06V 10/764

FOREIGN PATENT DOCUMENTS

JP 2019-067278 4/2019
JP 2019-191644 10/2019
JP 2021-140445 9/2021

OTHER PUBLICATIONS

Irifune, Yasuaki et al. Assigning detailed labels to time series data using weak labels. The 11th Forum on Data Engineering and Information Management (The 17th Annual Meeting of the Database Society of Japan). Mar. 2019, Cited in the ISR.
WIPO, International Search Report with English-language translation and Written Opinion with English-language partial translation, mailed Nov. 2, 2021, in connection with PCT/JP2021/035083.

* cited by examiner

FIG.1

A1
Dataset

A2
Correct answer label

Taxi

EV

Normally labelling by manpower, at higher costs

Training

A3
Learning model

FIG.2

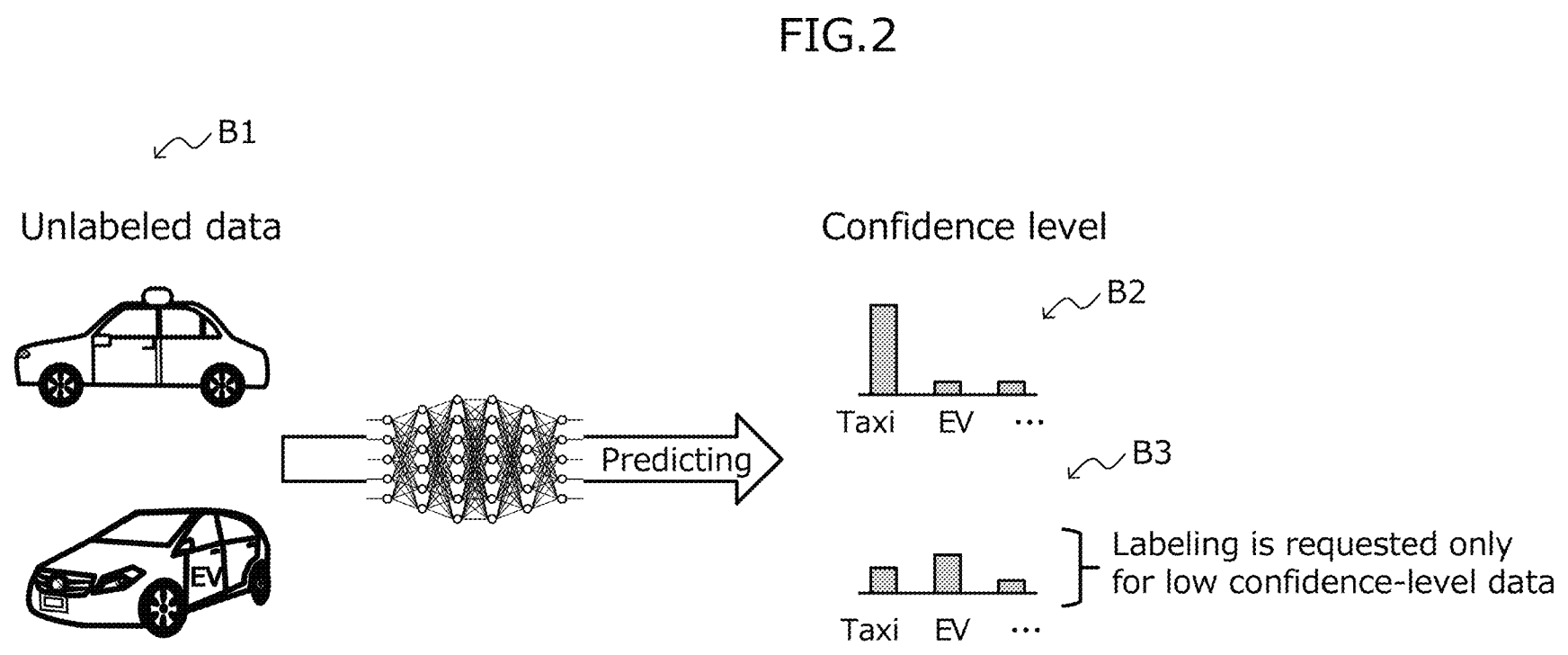

Unlabeled data

B1

Predicting

Confidence level

B2

Taxi EV ...

B3

Taxi EV ...

Labeling is requested only for low confidence-level data

Figure 4:
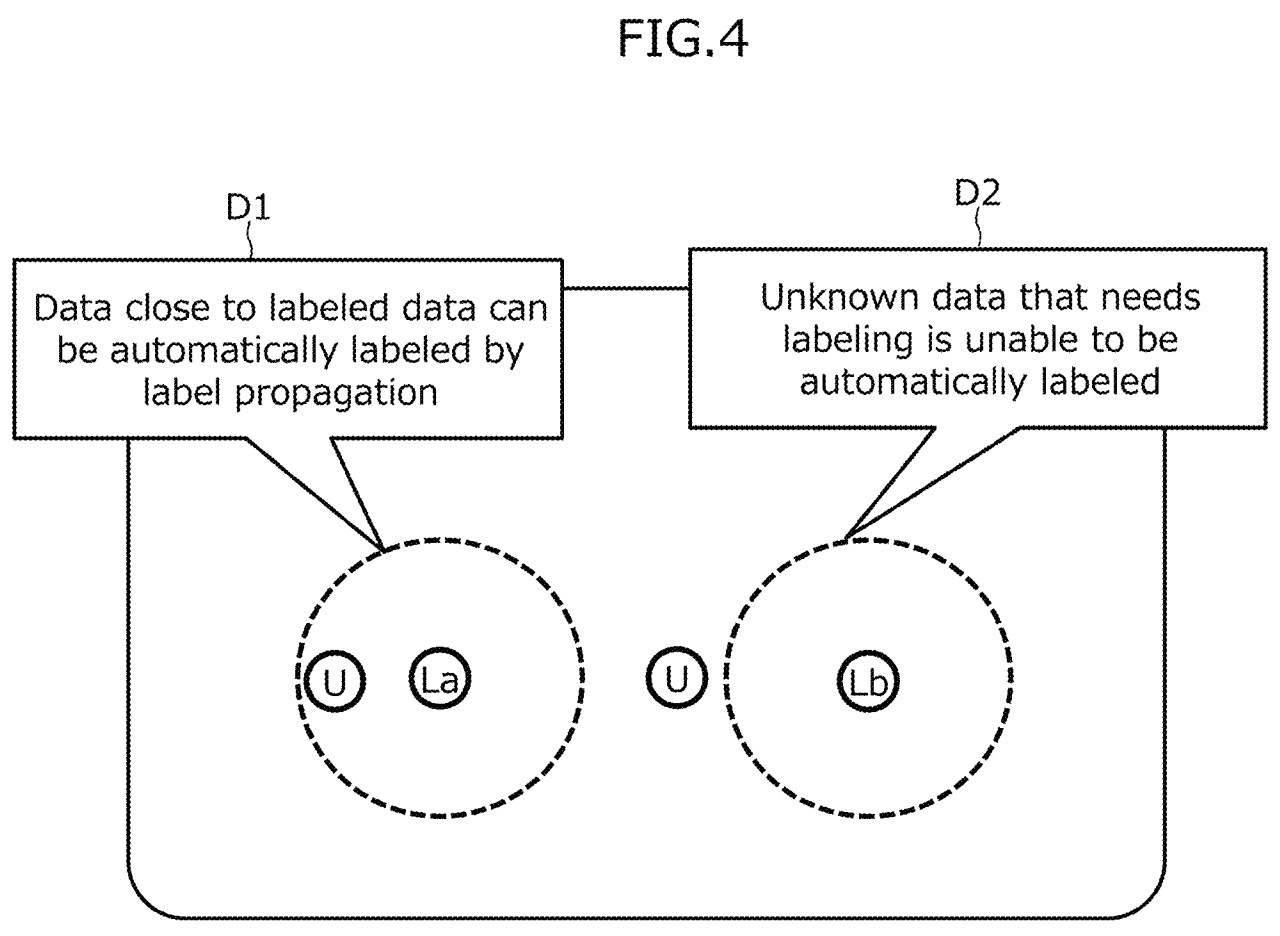

Data close to labeled data can be automatically labeled by label propagation

D2

Unknown data that needs labeling is unable to be automatically labeled

Figure 5:
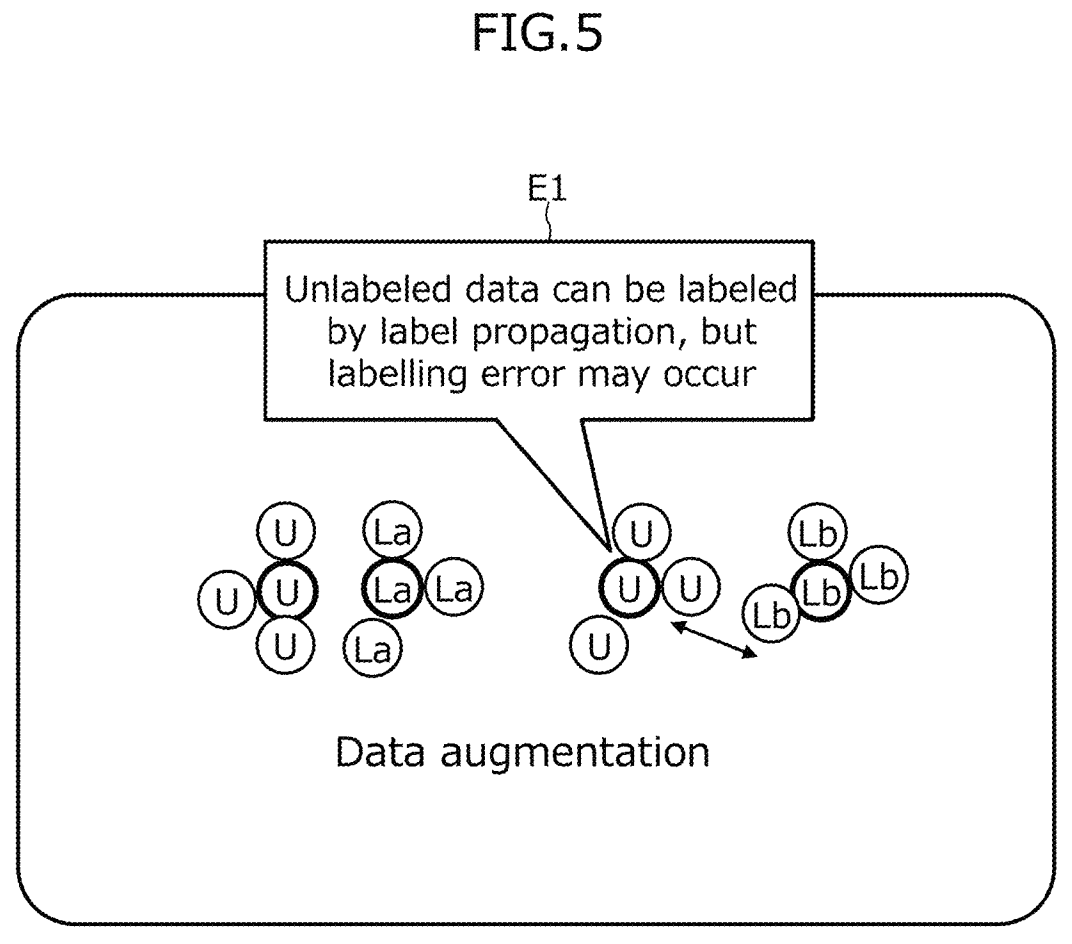

Unlabeled data can be labeled by label propagation, but labelling error may occur

U U U U

La La La La

U U U U

Lb Lb Lb Lb

Data augmentation

FIG.6

Obtain weak-labeled data

E2

U

La

Lb

Control data obtainer 131
1
Data gathering apparatus
11
CPU
12
Memory
13
Display controller
14
Storing device
16
15
Input IF
External recording medium processor
Communication IF
17
151
152
161
160
To external device 1
141
Unlabeled sensor information
111
Parameter predicting unit
Parameter
112
unlabeled data processing unit
Unlabeled data U
Data augmentation
$U_n$
113
Label predicting unit
Label
Label detecting unit
114
140
HDD
Success or failure of labeling
Parameter
Training dataset
Parameter learning unit
116
115
Label learning unit
Training phase
Predicting phase
Test data

FIG.9

MILK

1

Data gathering apparatus

F1

Weak-labeled data

Labeling

FIG.12

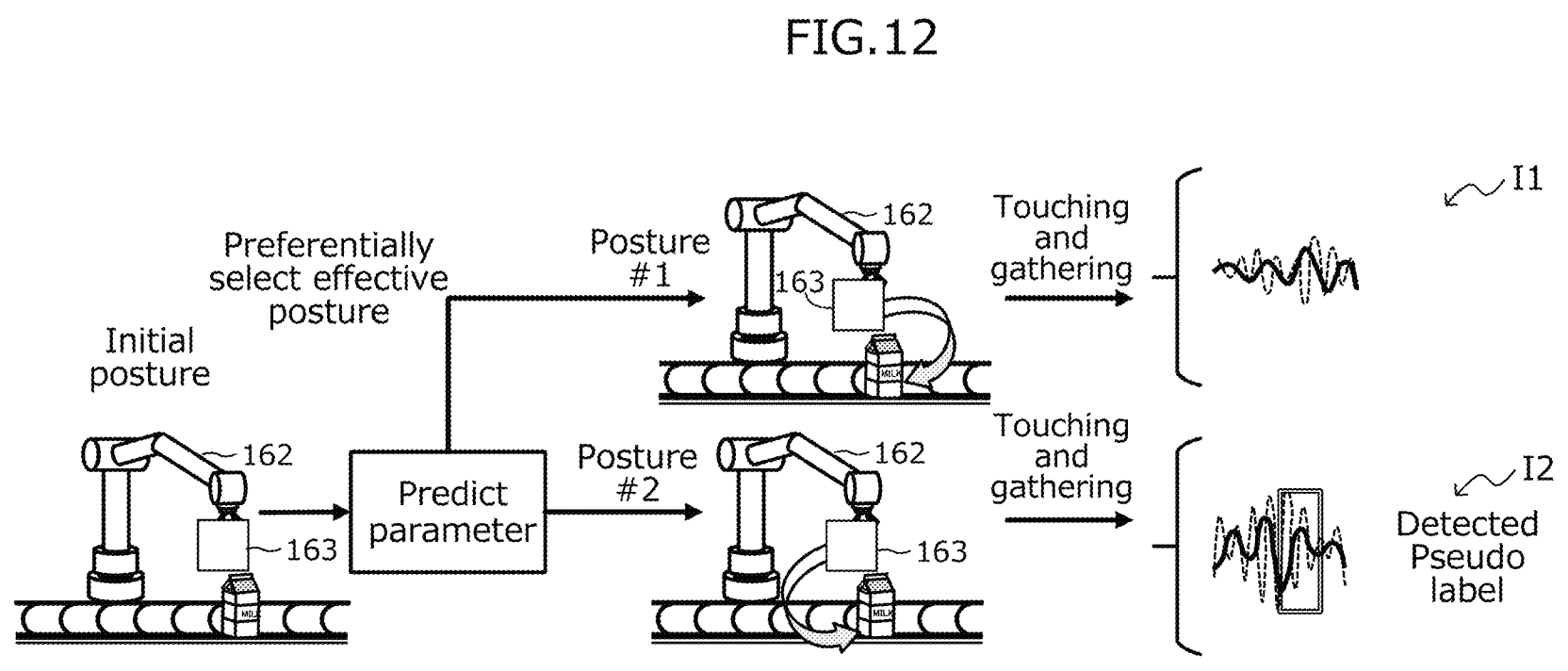

Initial posture

162

163

Preferentially select effective posture

Predict parameter

Posture #1

Posture #2

162

163

162

163

Touching and gathering

Touching and gathering

I1

I2

Detected Pseudo label

FIG.15

Camera parameter candidates

| Posture candidates | Confidence level c'1 | Confidence level c'2 |
|---|---|---|
| p_1 | 0.2 | 0.8 |
| ... | ... | |
| p_n2 | 0.9 | 0.1 |
| ... | ... | ... |
| p_N2 | 0.6 | 0.4 |

Specify highest confidence-level posture (L1)

FIG.16

M1
Initial posture
162
161
Move posture
M2
Posture p_n2
162
161
Photographing
M3
Weak-labeled data U_n1

FIG.18

Result of estimation(t1=0.8)

| Image | Confidence level c1 | c2 | c3 | L1 |
|---|---|---|---|---|
| u1'_n1 | 0.1 | 0.8 | 0.1 | c2 |
| u2'_n1 | 0.4 | 0.3 | 0.3 | - |
| u3'_n1 | 0.05 | 0.05 | 0.9 | c3 |
| ... | ... | ... | | |

Set highest confidence-level to Pseudo label L1 (O1)

FIG.19

P1
Weak-labeled data U_n1
P2
u3_n1
P3
Label detecting
Result of detection

FIG.24

Predicting phase

Start

S41 Read result of learning

S42 Read test data

S43 Calculate predicting candidates

End

RECORDING MEDIUM, DATA GATHERING APPARATUS, AND METHOD FOR GATHERING DATA

CROSS-REFERENCE TO RELATED APPLICATION

This application is a continuation application of International Application PCT/JP2021/035083 filed on Sep. 24, 2021 and designated the U.S., the entire contents of which are incorporated herein by reference.

FIELD

The embodiment(s) discussed herein is a recording medium, a data gathering apparatus, and a method for gathering data.

BACKGROUND

In machine learning, supervised learning that uses labeled data for learning is sometimes applied to the product-classification-problem and the like.

Figure 1:
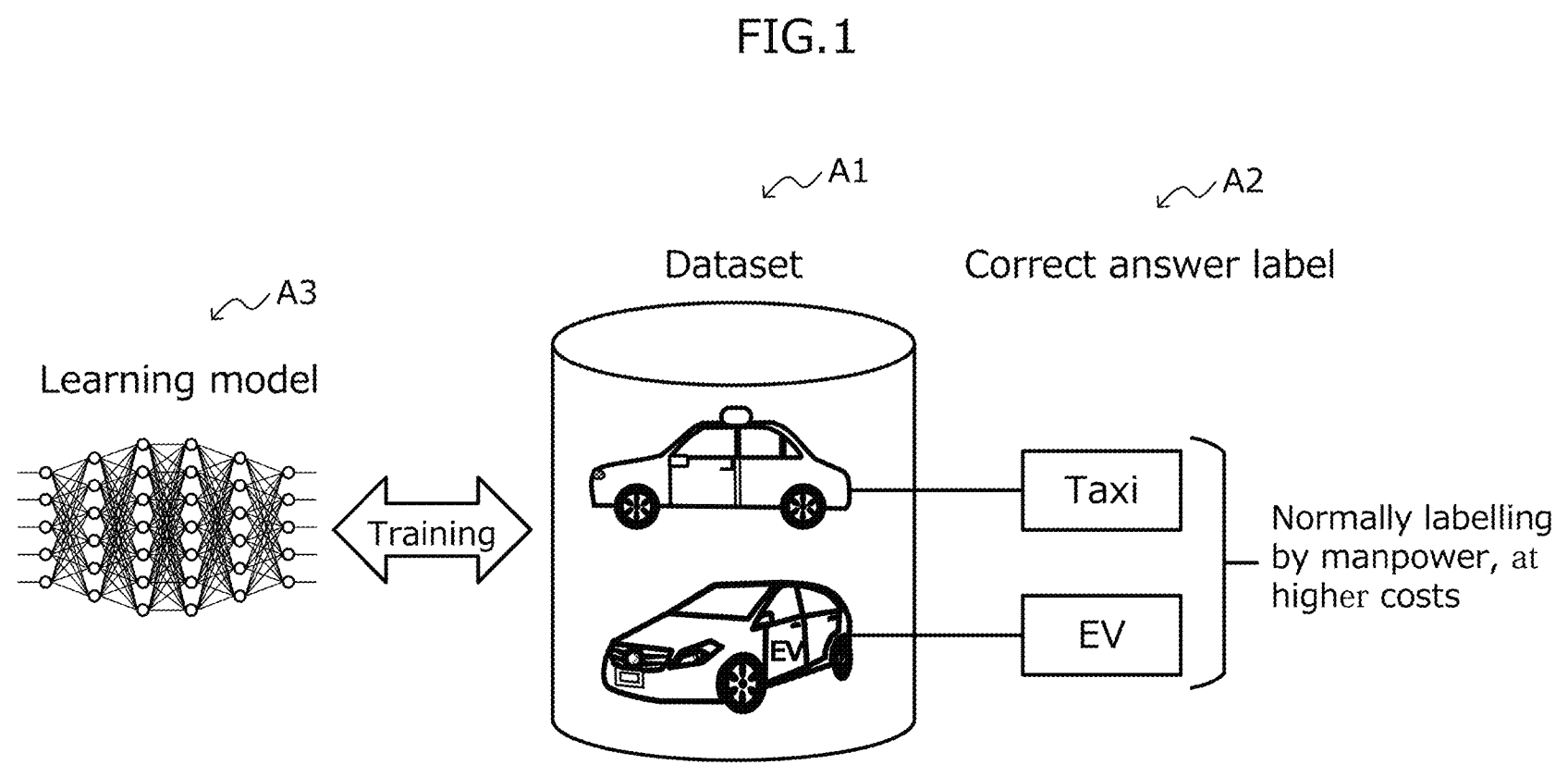

FIG. 1 is a diagram illustrating an example of providing a correct answer label to a dataset.

Correct answer labels illustrated by the reference sign A2 are provided to a dataset representing the images of motor vehicles indicated by the reference sign A1. In the example of FIG. 1, a taxi and an Electric Vehicle (EV) are provided as correct answer labels. Then, as indicated by the reference sign A3, training of the learning model is performed, using the labeled data.

Since labels are normally provided to such a dataset by manpower, the gathering cost for labeled data is higher than the cost for unlabeled data.

FIG. 2 is a diagram illustrating active learning.

Active learning may be performed in which unlabeled data is divided into known data (i.e., data of which label is estimatable at a high confidence level by a model being learned) and unknown data (i.e., data of which label is not classifiable by a model being learned) and labeling is requested for the unknown data.

As indicated in the reference sign B1, prediction using a learning model is made on unlabeled data of motor vehicle images, and confidence levels are calculated. In the example of calculating of the confidence level as indicated by the reference sign B2, the confidence level indicating that the motor vehicle image is a taxi is higher than the confidence level indicating that the motor vehicle image is another vehicle such as an EV. On the other hand, in the example of calculating of the confidence level as indicated by the reference sign B3, the confidence level indicating that a motor vehicle image is a taxi, the confidence level indicating that the motor vehicle image is an EV, and the confidence level indicating that the motor vehicle image is another vehicle are approximately the same. A requested for labeling only data with a low confidence level is sometimes issued to man.

Figure 3:
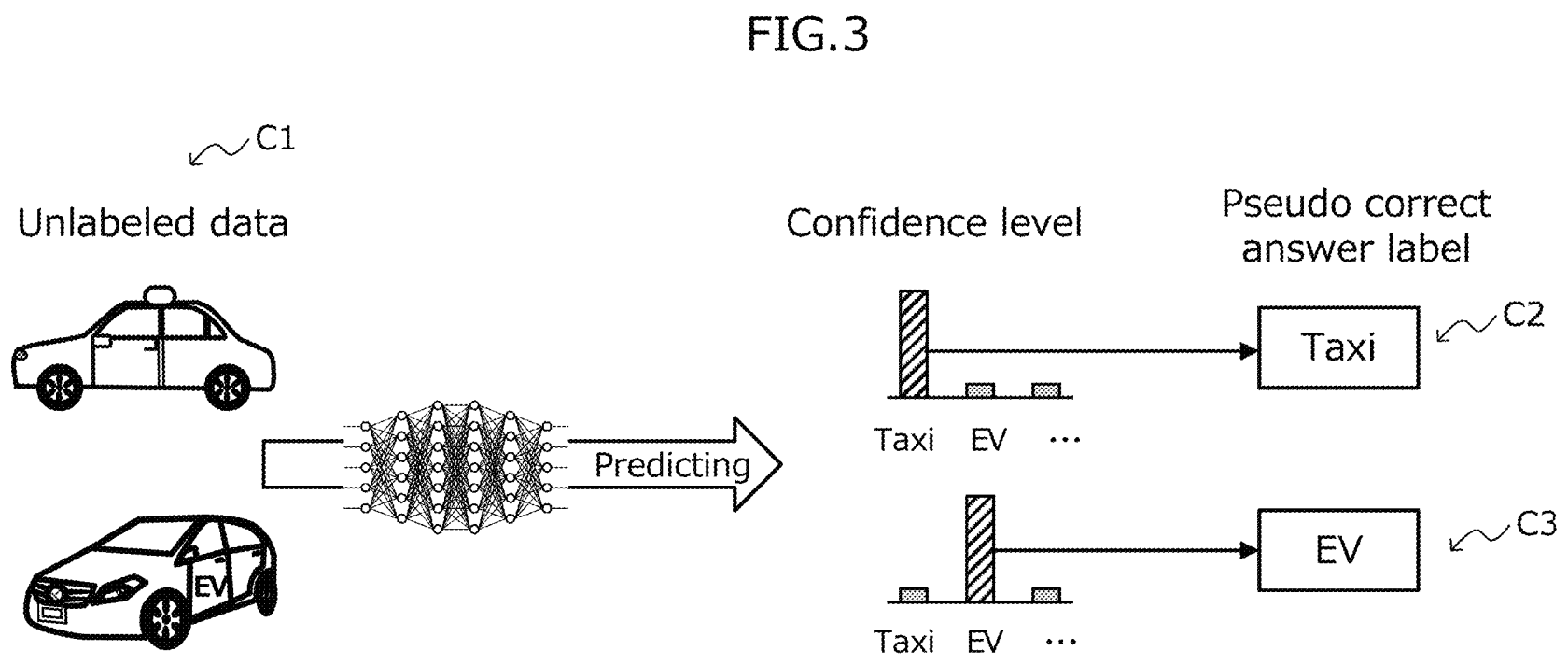

FIG. 3 is a diagram illustrating self-supervised learning.

On the assumption that data close to the labeled data has the same label, self-learning (in other words, label propagation) that automatically labels unlabeled data is sometimes carried out.

As indicated by the reference sign C1, prediction using a learning model is made on unlabeled data of motor vehicle images, and confidence levels are calculated. In the example of calculating of the confidence level as indicated by the reference sign C2, since the confidence level indicating that a motor vehicle image is a taxi is higher than the confidence level indicating that the motor vehicle image is another vehicle such as an EV, a label “taxi” is provided as a pseudo correct answer label. In the example of calculating of the confidence level as indicated by the reference sign C3, since the confidence level indicating that a motor vehicle image is an EV is higher than the confidence level indicating that the motor vehicle image is another vehicle, a label “EV” is provided as a pseudo correct answer label.

For example, a related art is disclosed in US Patent Application Publication No. 2020/0151692.

SUMMARY

According to an aspect of the embodiment, a non-transitory computer-readable recording medium has stored therein a data gathering program executable by one or more computers, the data gathering program including: performing data augmentation on unlabeled data; providing a particular label to a group of augmented data pieces generated by the data augmentation, the particular label indicating that labels of the augmented data pieces all match; and providing, when a label for one data piece of the augmented data pieces is determined, the label to one or more data pieces each provided with a particular label that is same as a particular label of the one data piece.

The object and advantages of the invention will be realized and attained by the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating an example of providing a correct answer label to a dataset;

FIG. 2 is a diagram illustrating active learning;

FIG. 3 is a diagram illustrating self-supervised learning;

FIG. 4 is a diagram illustrating a problem of labeling a dataset;

FIG. 5 is a diagram illustrating labeling by data augmentation;

FIG. 6 is a is a diagram illustrating labeling by controlling a data obtainer according to an embodiment;

FIG. 9 is a diagram briefly illustrating a label providing process of the embodiment;

FIG. 12 is a diagram illustrating a modification of the labeling process by controlling the data obtainer of FIG. 11;

FIG. 15 is a table illustrating an example of camera parameter candidates when the first control parameter predicting model of FIG. 14 is used;

FIG. 16 is a diagram illustrating a moving process of a camera posture according to the embodiment;

FIG. 18 is a table illustrating an example of a result of estimation when the first product classifying model of FIG. 17 is used;

FIG. 19 is a diagram illustrating a label detecting process according to the embodiment;

FIG. 24 is a flow chart illustrating a predicting process of test data according to the embodiment.

DESCRIPTION OF EMBODIMENT(S)

Figure 7:
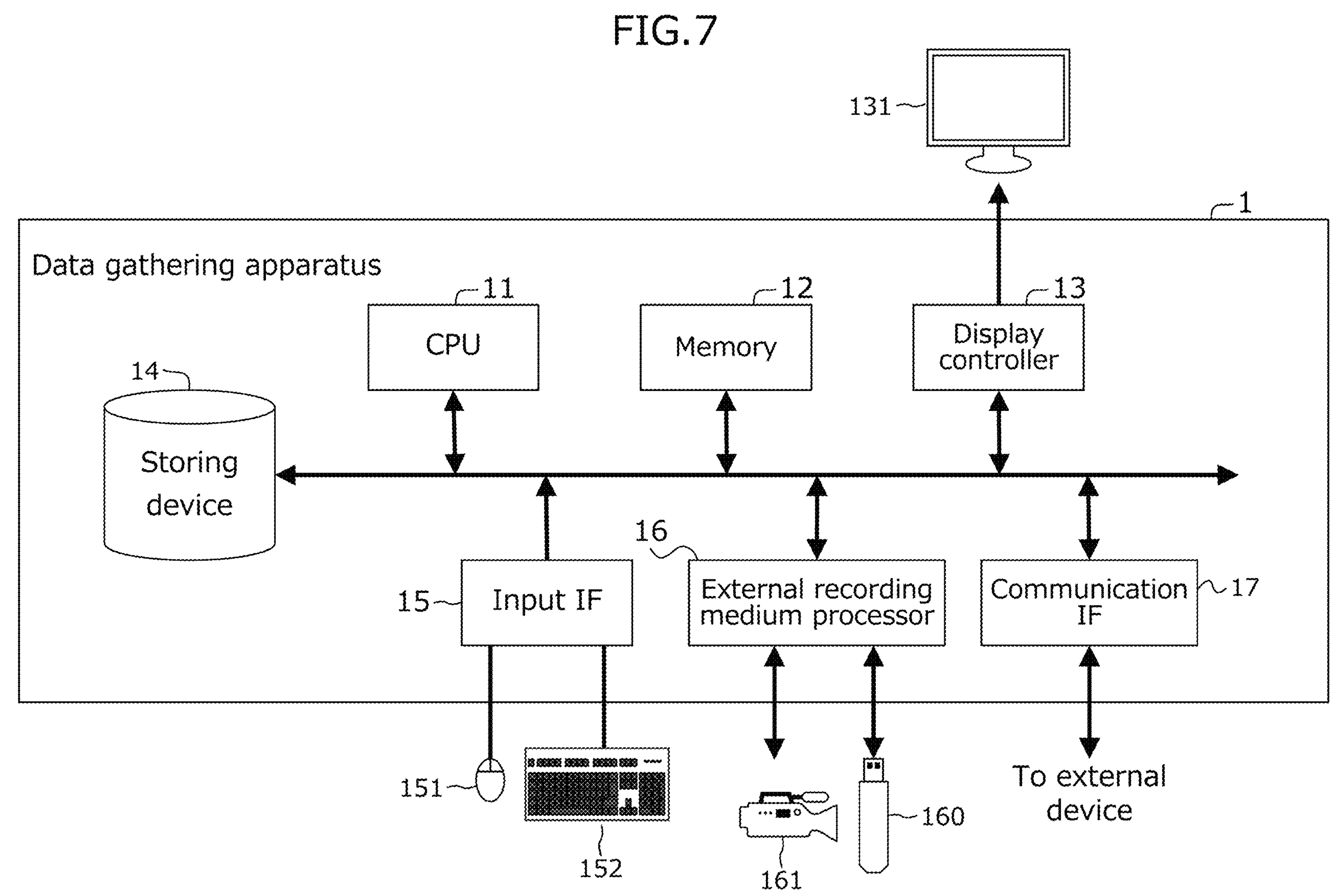
FIG. 7 is a block diagram schematically illustrating an example of a hardware configuration of a data gathering apparatus according to the embodiment.

FIG. 4 is a diagram illustrating a problem of labeling a dataset.

As described above, labeling even with active learning requires human cost. Even if self-learning (i.e., label propagation) is employed to reduce this human cost, most of the data close to labeled data is known data of which model is known data of which labels can be estimated at high confidence levels, which therefore limits the effects of reducing the human cost.

In the example indicated by the reference signal D1, the unlabeled data U is close to the labeled data La and therefore is able to be automatically labeled by label propagation. On the other hand, in the example indicated by the reference signal D2, the unlabeled data U is distant from the labeled data Lb and is unable to be automatically labeled even if the unlabeled data U is unknown data that requires to be labeled.

(A) Embodiment

Hereinafter, an embodiment will now be described with reference to the accompanying drawings. However, the embodiment described below is merely illustrative and is not intended to exclude the application of various modifications and techniques not explicitly described below. For example, the present embodiment can be variously modified and implemented without departing from the scope thereof. In addition, each drawing is not intended to include the components appeared therein, but may include an additional function, for example.

In the drawings to be used in the following description, the same reference numbers denote the same or similar parts, so repetitious description will be omitted here.

(A-1) Example of Configuration:

FIG. 5 is a diagram illustrating labeling by data augmentation.

Labels are provided to a dataset by generating data close to target data and shortening distances between data. For this purpose, data augmentation and label propagation of unlabeled/labeled data are assumed to be carried out.

In the example indicated by the reference sign E1, multiple pieces of unlabeled data U are collectively provided with labels through data augmentation on the unlabeled data U. This allows labeling by label propagation, but if data augmentation is excessively intensive, a wrong label may be provided by under the presence of another labeled data La. In particular, correct labeling may be unstable in the initial phase of leaning.

Figure 6:
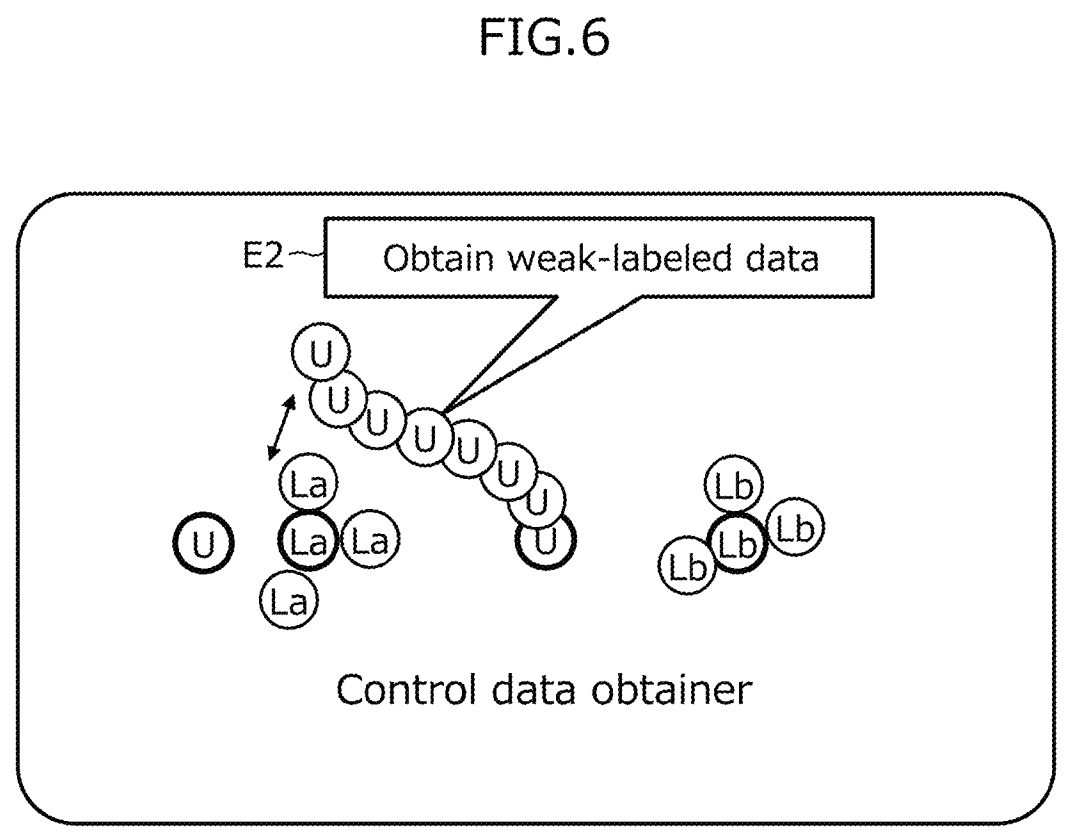

FIG. 6 is a is a diagram illustrating labeling by controlling a data obtainer according to the embodiment.

In the present embodiment, data (i.e., weak-labeled data) having the same label as unlabeled data is consecutively obtained by moving or focusing a data obtainer such as a camera 161 (to be detailed below with reference to FIG. 7).

In the example indicated by the reference sign E2, the unlabeled data U is differentiated from another labeled data Lb by obtaining multiple pieces of consecutive unlabeled data U close to the labeled data La.

FIG. 7 is a block diagram schematically illustrating an example of a hardware configuration of the data gathering apparatus 1 according to the embodiment.

As illustrated in FIG. 7, the data gathering apparatus 1 includes a Central Processing Unit (CPU) 11, a memory 12, a display controller 13, a storing device 14, an input interface (IF) 15, an external recording medium processor 16, and a communication IF 17.

The memory 12 is an example of a storing device, and is exemplified by a Read Only Memory (ROM) and a Random Access Memory (RAM). Into the ROM of the memory 12, a program such as a Basic Input/Output System (BIOS) may be written. The software program in the memory unit 12 may be appropriately read and executed by the CPU 11. The RAM of the memory 12 may be used as a temporary recoding medium or a working memory.

The display controller 13 is connected to a display 131 and controls the displaying device 131. The display 131 is exemplified by a liquid crystal display, an Organic Light-Emitting Diode (OLED) display, a Cathode Ray Tube (CRT), an electronic paper display, and displays various pieces of information to the operator. The display 131 may be combined with an input device and may be a touch panel.

The storing device 14 is one having high IO performance, and may be, for example, a Dynamic Random Access Memory (DRAM), an SSD, a Storage Class Memory (SCM), and an HDD.

The input IF 15 may be connected to an input device such as a mouse 151 and a keyboard 152, and may control the input device such as the mouse 151 and the keyboard 152. The mouse 151 and the keyboard 152 is an example of an input device and the operator makes an input operation using these input devices.

The external recording medium processor 16 is configured to allow a non-transitory recording medium 160 to be mountable thereon. The external recording medium processor 16 is configured to be capable of reading, in a state of being mounted with the recording medium 160, information recorded in the recording medium 160. In the present embodiment, the recording medium 160 is portable. Examples of the recording medium 160 is a flexible disk, an optical disk, a magnetic disk, a magneto-optical disk, and a semiconductor memory. The external recording medium processor 16 is connected to a camera 161 to obtain an image photographed by the camera 161, and may control the position and the posture of the camera 161.

The communication IF 17 is an interface that allows the data gathering apparatus 1 to communicate with an external device.

The CPU 11 is an example of a processor, and is a processing device that carries out various controls and calculations. The CPU 11 achieves various functions by executing an operating system (OS) and a program read into the memory unit 12.

The device that controls the overall operation of the data gathering apparatus 1 is not limited to the CPU 11, but may alternatively be, for example, any one of Micro Processing Units (MPUs), Digital Signal Processors (DSPs), Application Specific Integrated Circuits (ASICs), Programmable Logic Devices (PLDs) and Field Programmable Gate Arrays (FPGAs) or any combination of two or more of CPUs, MPUs, DSPs, ASICs, PLDs, and FPGAs.

Figure 8:
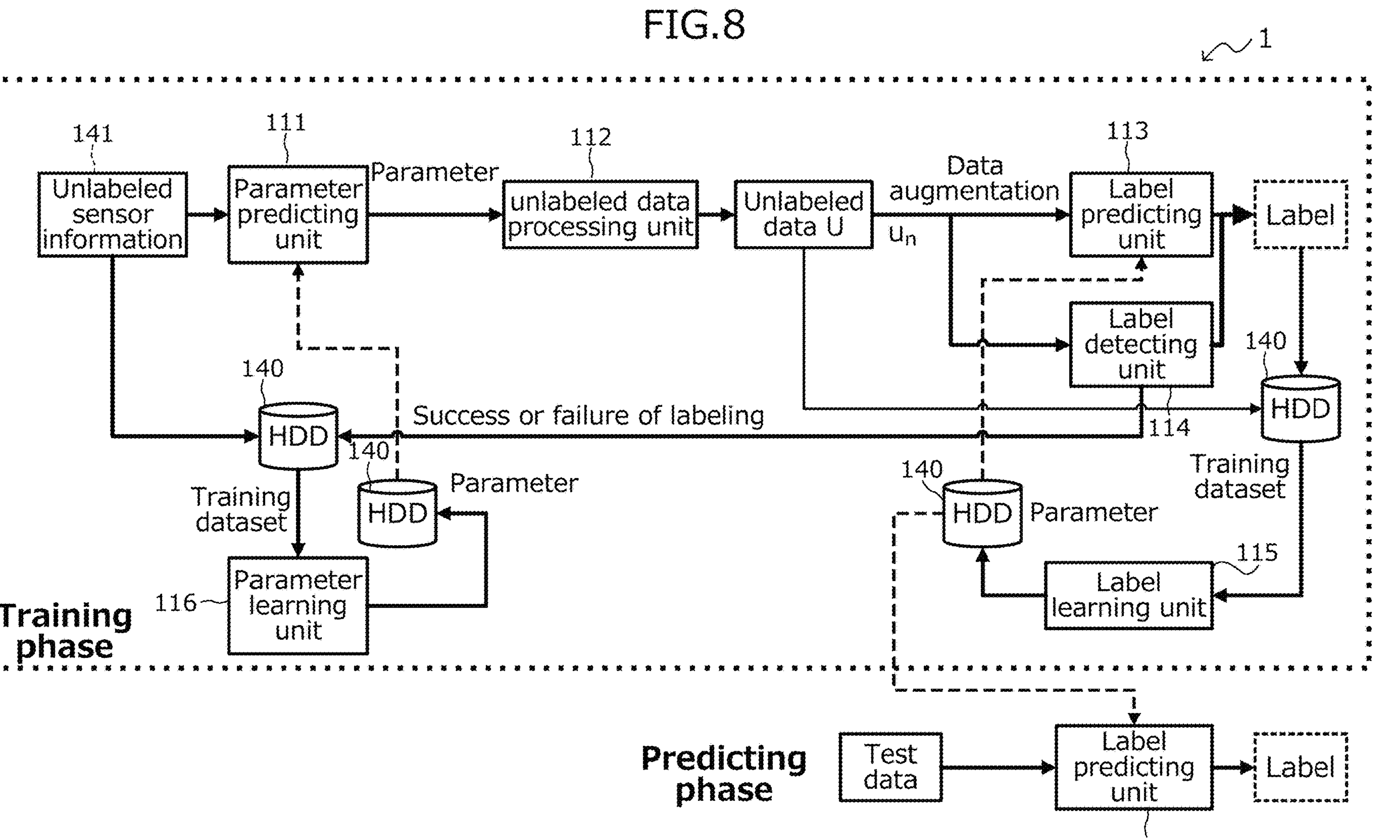
FIG. 8 is a block diagram schematically illustrating an example of a software configuration of the data gathering apparatus of FIG. 7.

FIG. 8 is a block diagram schematically illustrating an example of a software configuration of the data gathering apparatus 1 of FIG. 7.

The CPU 11 of the data gathering apparatus 1 illustrated in FIG. 7 functions as a parameter predicting unit 111, an unlabeled data processing unit 112, a label predicting unit 113, a label detecting unit 114, a label learning unit 115, and a parameter learning unit 116.

Once an unlabeled sensor information 141 is obtained from the camera 161, the unlabeled sensor information 14 may be transmitted to a parameter predicting unit 111 and also stored in an HDD 140. The HDD 140 is an example of a storing device 14.

The parameter predicting unit 111 calculates a parameter to control the camera 161 on the basis of unlabeled sensor information 141 transmitted from the camera 161 or stored in the HDD 140 such that the possibility of detecting a label is enhanced. The calculated parameter is transmitted to the unlabeled data processing unit 112 and also stored in the HDD 140. The process in the parameter predicting unit 111 will be detailed below with reference to FIG. 11 and FIG. 12, for example.

The parameter learning unit 116 performs learning of a first control parameter predicting model (to be described below with reference to FIG. 14, for example).

The unlabeled data processing unit 112 retrieves multiple pieces of unlabeled data Un. The unlabeled data processing unit 112 provides the multiple pieces of unlabeled data Un with a weak label indicating that the multiple pieces of unlabeled data Un all match. The unlabeled data processing unit 112 labels Un belonging to U using a learning model (i.e. the label detecting unit 114) or a model being learned (i.e., the label predicting unit 113). The unlabeled data processing unit 112 stores the unlabeled data Un into the HDD 140. The process in the unlabeled data processing unit 112 will be detailed below with reference to FIG. 9, for example.

The label predicting unit 113 performs a data augmentation process and a label propagation process in a training phase. The label predicting unit 113 uses a first product classifying model (described below with reference to FIG. 17, for example) in the predicting phase. The label predicting unit 113 stores the predicted label into the HDD 140. The label predicting unit 113 predicts a label based on the obtained test data in the predicting phase. The process in label predicting unit 113 will be detailed below with reference to FIG. 10, for example.

The label detecting unit 114 performs a labeling process on unlabeled data Un. The label detecting unit 114 stores the success or failure in labeling in the HDD 140. The process in the label detecting unit 114 will be detailed below with reference to FIG. 10, for example.

The label learning unit 115 reads a training dataset from the HDD 140, performs label-learning, and stores the result of the learning into the HDD 140. The label learning unit 115 uses the first product classifying model (described below with reference to FIG. 17, for example) in the learning phase.

As described above, the data gathering apparatus 1 performs data augmentation on unlabeled data and provides a particular label to a group of augmented data pieces generated by the data augmentation, the particular label indicating that labels of the augmented data pieces all match. In addition, when a label for one data piece of the augmented data pieces is determined, the data gathering apparatus 1 provides the label to one or more data pieces each provided with a particular label (i.e., weak label) that is same as a particular label of the one data piece.

Figure 9:
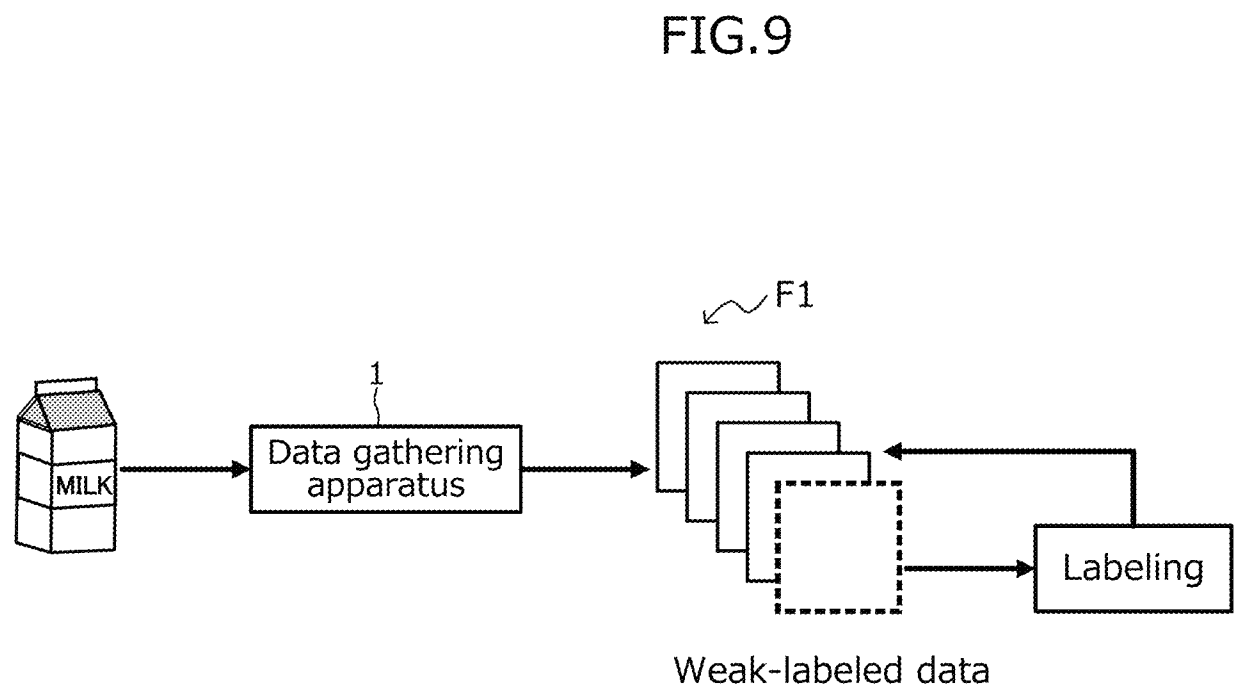

FIG. 9 is a diagram briefly illustrating a label providing process of the embodiment.

The unlabeled data processing unit 112 obtains multiple pieces of unlabeled data related to the target data and provides a weak label, which represents that the labeled data pieces provided with the same label, to the obtained data. The unlabeled data processing unit 112 obtains multiple pieces of weak-labeled data by performing consecutive data augmentation using, for example, a video image. As indicated by the reference sign F1, by weak-labeling one of the multiple pieces of unlabeled data, all pieces of the unlabeled data can be labeled.

Figure 10:
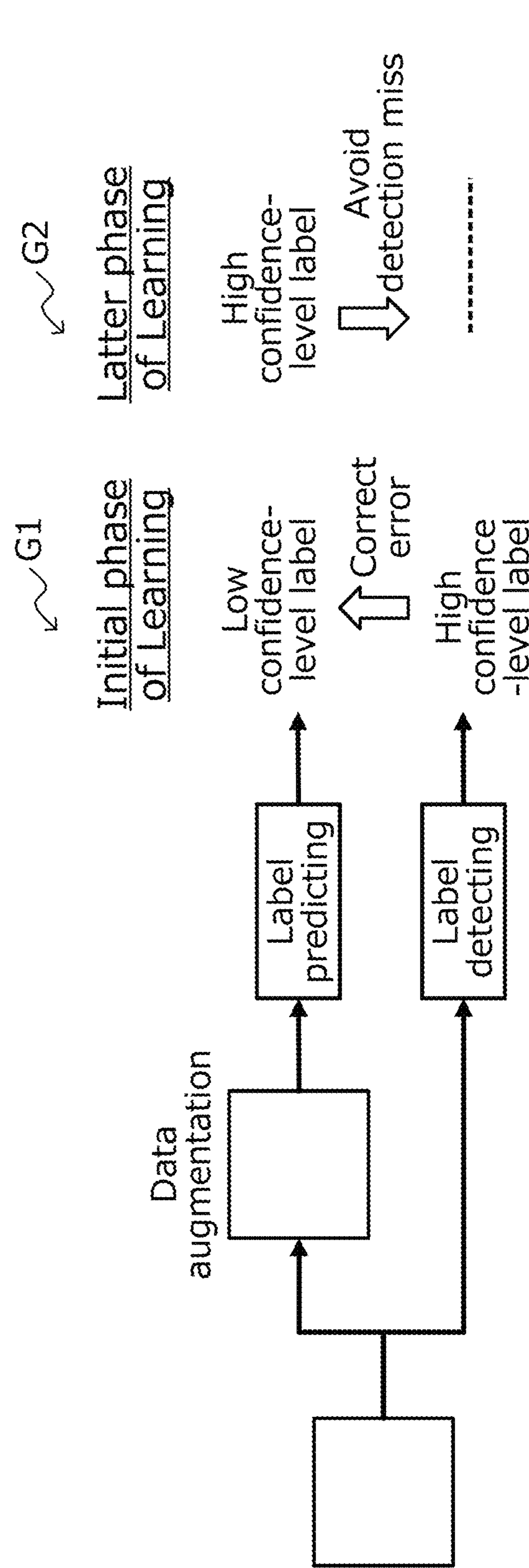
FIG. 10 is a diagram illustrating a labeling process using similarity of the embodiment.

FIG. 10 is a diagram illustrating a labeling process using similarity of the embodiment.

Labeling may be performed, using the similarity between the measured data or the similarity of an output label. By using two types of predicting paths of a model being learned with a low confidence level and a model already finished learning with a high confidence level, it is possible to cover labeling error in label propagation. By using a label detector such as a barcode reader being based on image processing and ensuring a high confidence level, labeling with a low confidence level of label propagation can be compensated for. In conjunction with the process illustrated in FIG. 9, this process can deal with a problem of being unable to label data that active learning requests to label by label propagation.

In the initial phase of learning indicated by the reference signal G1, a label detecting process that provides a high confidence-level label corrects an error in a label predicting process that provides a low confidence-level label. On the other hand, in the latter phase of learning indicated by the reference sign G2, a label predicting process that labels with a high confidence level can avoid a detection miss in the label detecting process.

Figure 11:
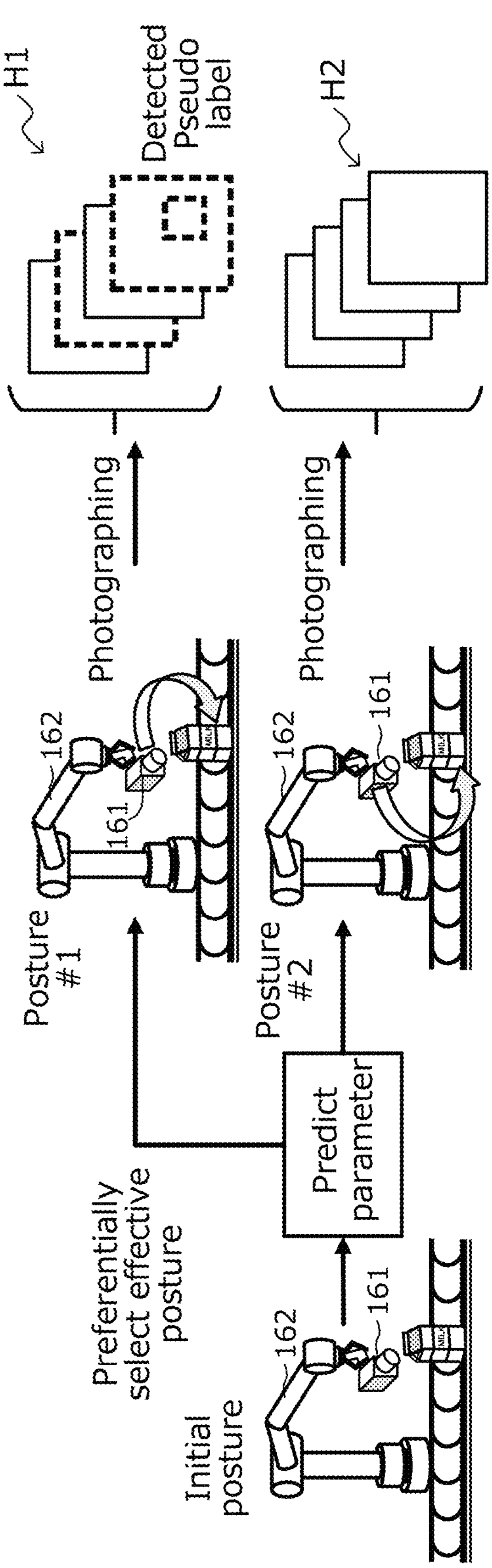
FIG. 11 is a diagram illustrating a labeling process by controlling a data obtainer according to the embodiment.

FIG. 11 is a diagram illustrating a labeling process by controlling a data obtainer according to the embodiment.

The parameter predicting unit 111 achieves efficient control by predicting a result of controlling the data obtainer such as the camera 161. The parameter predicting unit 111 randomly controls the data obtainer in the initial phase of the learning, but comes to control the data obtainer to photograph an object face having label information such as a bar code as the learning proceeds.

The camera 161 is installed in a robot 162 capable of controlling the position and the posture of the camera 161. The camera 161 can be preferentially changed from the initial posture to an effective posture through a parameter predicting process. In the example of FIG. 11, the posture #1 indicated by the reference sign H1 is more preferentially selected than the posture #2 indicated by the reference sign H2, and a pseudo label is detected in a photographed image.

The robot 162 for product classification is a robot that recognizes a product on a production line in a factory, for example. Machine learning, particularly deep learning, may be used as an apparatus for classifying a product. The deep learning can easily construct a high-precision classifier by preparing training data containing a large number of pairs of an input and a required output and performing supervised learning using the training data.

However, since products that a factory handles occasionally vary, labeling by manpower each time of the variation takes costs.

As a solution to the above, the present embodiment automatically labels unlabeled data by gathering weak-labeled data and labeling a part of the gathered data by data augmentation and label propagation or high confidence-level label detection. This reduces the human costs for labeling training data to be used in machine learning.

FIG. 12 is a diagram illustrating a modification of the labeling process by controlling the data obtainer of FIG. 11.

The example of FIG. 11 uses a visual sensor (i.e., the camera 161) as a typical data obtainer, but may use another sensor. In the example of FIG. 12, a touch sensor 163 is installed as another sensor. By installing the touch sensor 163, a material-classification-problem can be dealt. The label detecting unit 114 uses a model previously learned. In the initial phase of learning, the label detecting unit 114 randomly controls the touch sensor 163 but comes to control the touch sensor 163 to touch a characteristic point as the learning proceeds.

The touch sensor 163 is installed in a robot 162 capable of controlling the position and the posture of the touch sensor 163. The touch sensor 163 can be preferentially changed from the initial posture to an effective posture through a parameter predicting process. In the example of FIG. 12, the posture #2 indicated by the reference sign I2 is more preferentially selected than the posture #1 indicated by the reference sign I1, and a pseudo label is detected from the obtained touching data.

Figure 13:
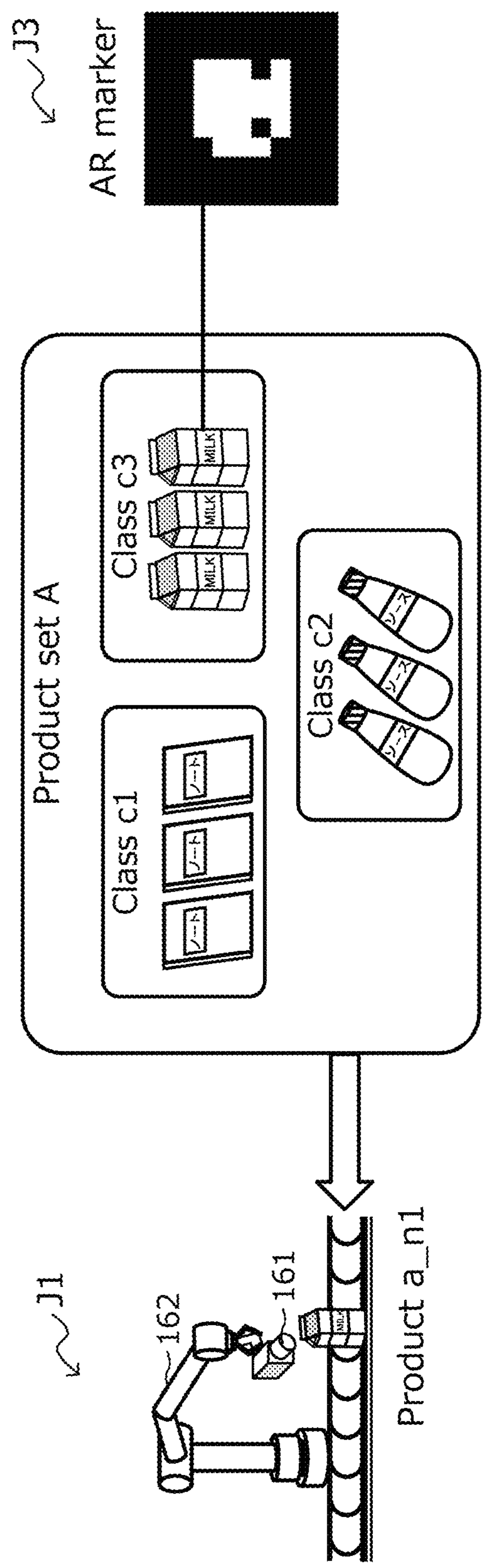
FIG. 13 is a diagram illustrating an example of installing of a data obtaining target object according to the embodiment.

FIG. 13 is a diagram illustrating an example of installing of a data obtaining target object according to the embodiment.

A training dataset (see the reference sign J2) gathered by the robot 162 (see the reference sign J1) for product classification is images obtained by photographing products flowing on the conveyor. Here, it is assumed that an Augmented Reality (AR) marker (refer to the reference sign J3) capable of identifying a product class is attached to the product.

Here, the "AR marker" may be one that can identify another product class. For example, example of the AR marker are a "logo" in a manufacturer classification and a "bar code" for reading a product. The AR marker may be a one-dimensional code or a two-dimensional code.

In addition, as the hardware, a robot 162 in which a camera 161 of a RGB format is attached to a hand part is used.

First of all, the target product a_n1 flows on the conveyor and is automatically positioned in front of the robot 162. The initial posture of the robot 162 is a posture that the camera 161 points vertically downward from the top of the conveyor. The conveyor is stopped at the position where the center of the object coincides with the center of the image photographed by the camera 161, and the process proceeds to the following process.

Figure 14:
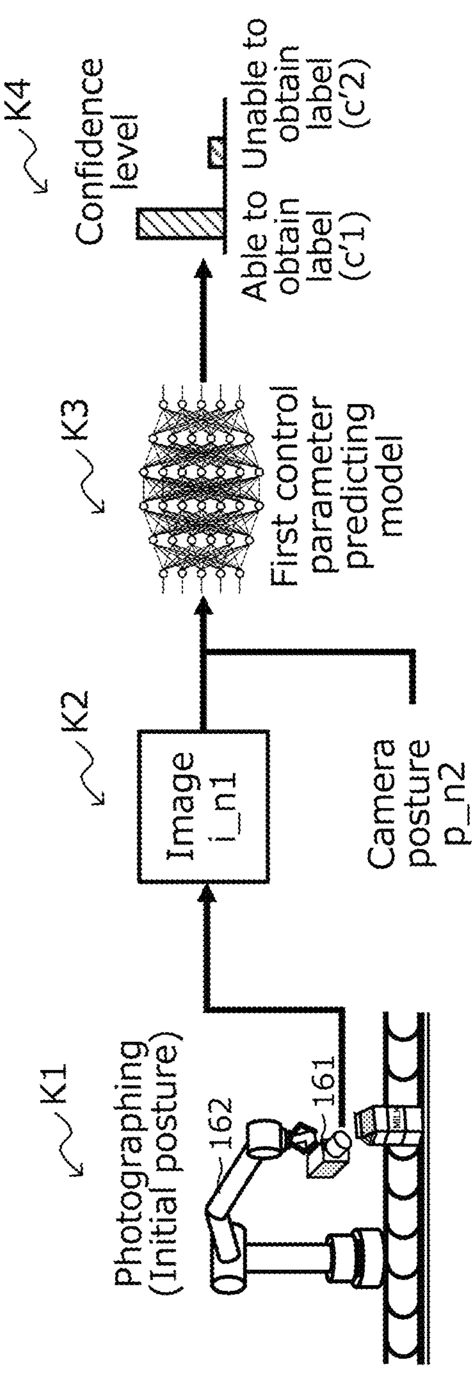
FIG. 14 is a diagram illustrating a first control parameter predicting model according to the embodiment.

FIG. 14 is a diagram illustrating a first control parameter predicting model according to the embodiment.

The parameter predicting unit 111 determines camera posture p=(x, y, z, roll, pitch, yaw) for photographing consecutive images. The parameter predicting unit 111 obtains a photographed image i_n1 (see the reference sign K2) in the initial posture (see the reference sign K1). A transitable camera posture (e.g., p_1, p_2, . . . , p_N2) may be prepared in advance.

The parameter predicting unit 111 makes adjustment such that the center of the object is positioned at the center of an image that can be obtained in a transitable camera posture. The number of camera postures to be prepared may be adjusted on the basis the number of objects or the like.

The parameter predicting unit 111 inputs a possible camera posture into a first control parameter predicting model (see the reference sign K3) and predicts the presence or absence of label information.

Then, as indicated by the reference sign K4, the parameter predicting unit 111 performs a full search and identifies the posture p_n2 with the highest confidence level (c'1) of being able to obtain a label.

The first control parameter predicting model is a learning device that predicts whether to be able to obtain label information, using the images and the control parameter of the data obtainer as inputs. Gathering apparatus parameter learning means: Among the above, one or ones used when the first control parameter predicting model is learned.

As the first control parameter predicting model, a deep learning device including a three-layer convolution and a three-layer Multilayer perceptron (MLP) or another model may be used.

The image is input to the convolution, combined with an extracted feature and a camera parameter, and input into the three-layer parameter.

FIG. 15 is a table illustrating an example of camera parameter candidates when the first control parameter predicting model of FIG. 14 is used.

Among the camera parameter candidates of FIG. 15, as indicated by the reference sign L1, the posture candidate p_n2, which has the highest confidence level (c'1) of being able to obtain a label being 0.9, is identified as the posture with the highest confidence level.

Figure 16:
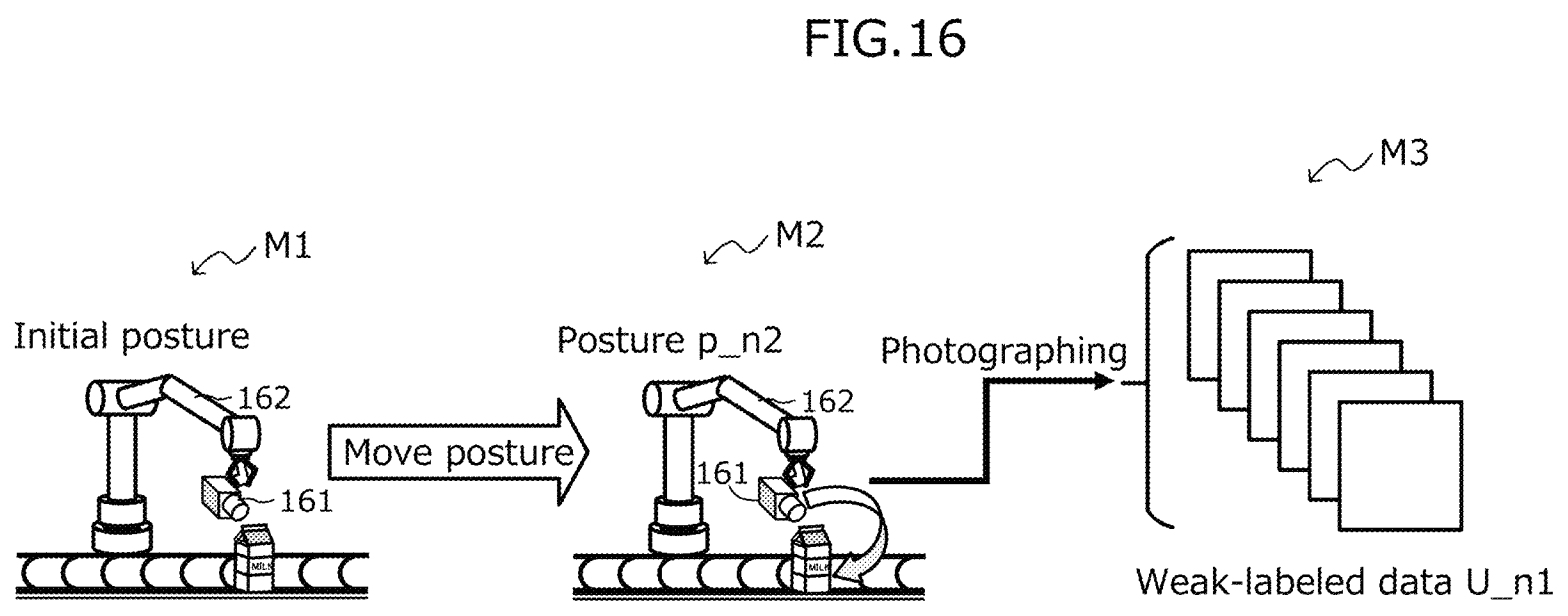

FIG. 16 is a diagram illustrating a moving process of a camera posture according to the embodiment.

By changing the posture of the robot 162 and causing the camera 161 to take photographs while the changing, multiple consecutive object images are obtained.

As indicated by the reference sign M1, the center of the object is overlapped with the center of the photographing range of the camera 161 in the initial posture.

As indicated by the reference sign M2, the camera 161 is controlled to move toward the posture p_n2, which has been estimated by the processes described above with reference to FIGS. 14 and 15, and images are obtained at all times during the movement. During the movement, the camera 161 is caused to center the object at all times.

As indicated by the reference sign M3, the multiple obtained images U_n1 always contain the same object a_n1, and a weak label indicating the same object class is provided to the images U_n1.

Figure 17:
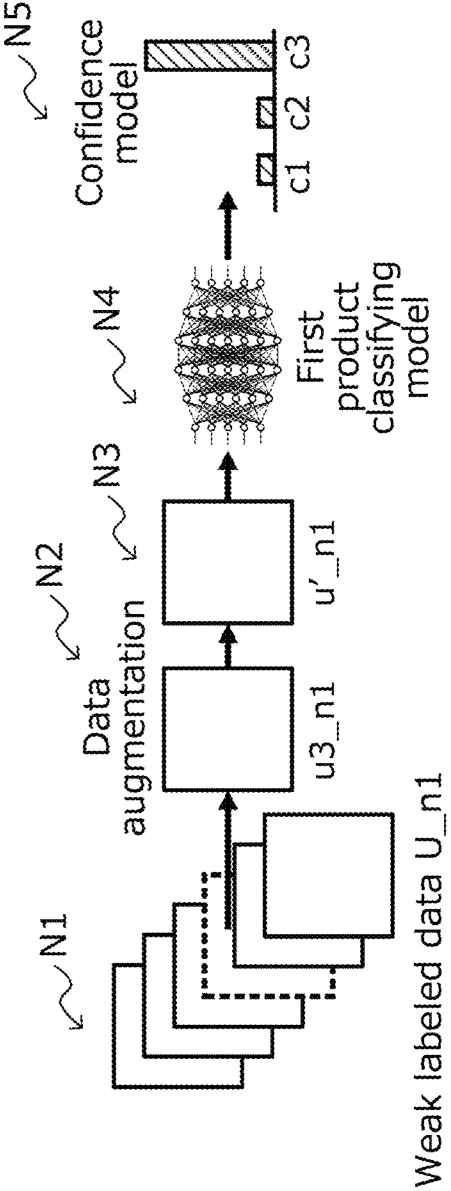
FIG. 17 is a diagram illustrating an example of using of a first product classifying model according to the embodiment.

FIG. 17 is a diagram illustrating an example of using of a first product classifying model according to the embodiment.

The label is estimated by performing data augmentation and label propagation as indicated by the reference sign N2 on the weak-labeled data U_n1 (see the reference sign N1). Random data augmentation (e.g., Gaussian Blur, cropping, rotation, brightness-saturation conversion) is performed on u_n1 belonging to U_n1 to thereby generate u'_n1 as indicated by the reference sign N3.

As indicated by the reference sign N4, u'_n1 is inputted to the first product classifying model and the class label l1_u'_n1 is thereby estimated.

All the images in U_n1 are processed in the same way, and if the highest confidence level l1_u'_n1 exceeds the threshold t1, the highest confidence level l1_u'_n1 is set to the pseudo label L1 with a low confidence level which the first product classifying model provides. In the example of FIG. 17, the confidence level of c3 confidence level is high as indicated by the reference sign N5.

The first product classifying model is a learning device that predicts a class label by using an image as an input. As the first product classifying model, a ResNet or another model may be used.

FIG. 18 is a table illustrating an example of a result of estimation when the first product classifying model of FIG. 17 is used.

As indicated by the reference sign O1, in the image u3'_n1, the confidence level c3 being 0.9, which is the highest is set to the pseudo label as the highest confidence-level label.

Figure 19:
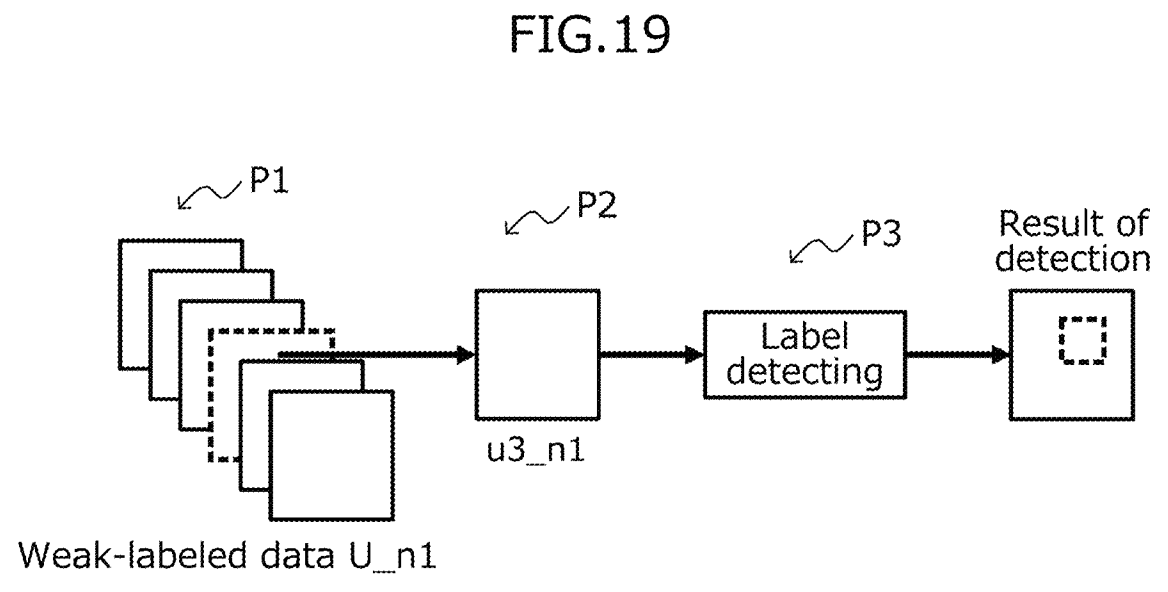

FIG. 19 is a diagram illustrating a label detecting process according to the embodiment.

On the image u3_n1 (see the reference sign P2) satisfying the relationship that u_n1 belongs to U_n1 (see the reference number P1), a label detecting process (see the reference signal P3) for an AR marker is performed.

Then, the same process is performed on all the images in U_n1, and the class label detected the largest number of times is set as the pseudo label L2 with the high confidence level that the label detecting unit 114 provides.

Figure 20:
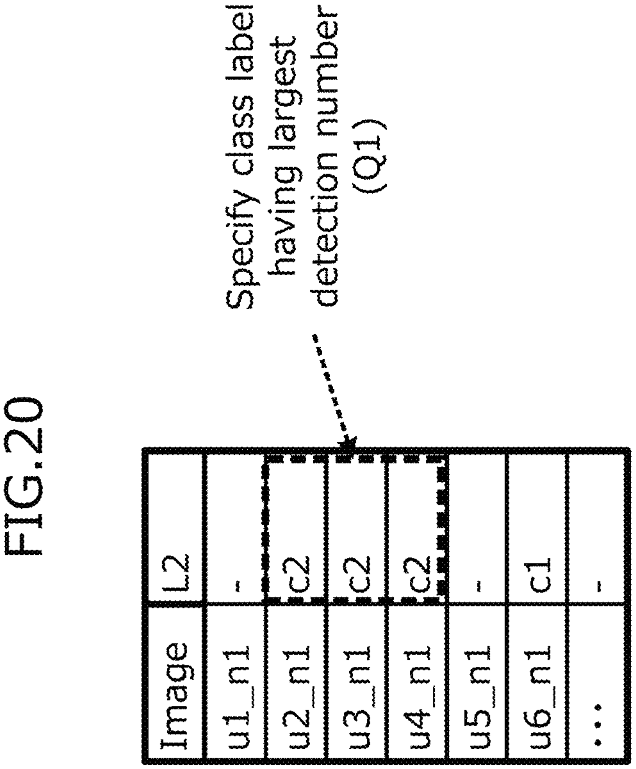
FIG. 20 is a table illustrating an example of a result of estimation when the label detecting process of FIG. 19 is carried out.

FIG. 20 is a table illustrating an example of a result of estimation when the label detecting process of FIG. 19 is carried out.

As indicated by the reference sign Q1, in result of estimation, the class level c2 having the largest detection number as the pseudo label L2 is identified.

Figure 21:
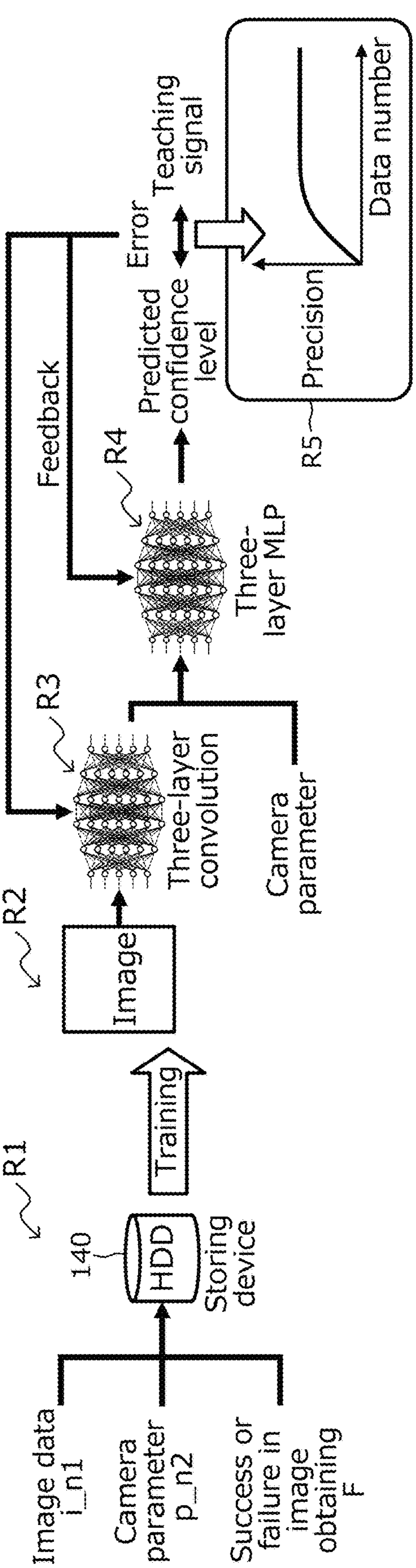
FIG. 21 is a diagram illustrating an example of training of the first parameter predicting model according to the embodiment.

FIG. 21 is a diagram illustrating an example of training of the first parameter predicting model according to the embodiment.

The result of success or failure in providing a pseudo label L2 is represented by F. When the pseudo label L2 is not provided (F=0), data gathering and label predicting are repeated along the following procedure. If N2 camera parameters have not yet been attempted, providing of a pseudo label is carried out again by returning the camera 161 to the initial posture, controlling the posture of the camera 161, and photographing by the camera 161. If the N2 camera parameters have already been attempted, the process proceeds to a branch process performed when a pseudo label is provided.

Also when the pseudo label L2 is provided (F=1), data gathering and label predicting are repeated along the following procedure. If a data gathering process has been performed on N1 objects, the entire process is terminated. Otherwise, a new object a_(n1+1) is placed and the process returns to searing for the camera parameter.

Regardless of whether or not a pseudo label is attached, the first dataset (i_n1, p_n2, F) may be added as the training data. The label learning unit 115 trains a model using the first dataset. The training of the model may be carried out at any timing. The training may be carried out every time datasets reaches a defined number (e.g., 100 datasets are gathered). The precision is gradually improved as data gathers.

The first dataset is used when the first control parameter predicting model is trained and a dataset is being gathered.

In the example of FIG. 21, image data i_n1, camera parameter p_n2, and success or failure F in image obtaining are stored in the storage device of the HDD 140, for example, as indicated by the reference sign R1, and used for training.

When an image are inputted as indicated by the reference sign R2, three-layer convolution is performed as indicated by the reference sign R3. Then, on the basis of the result of the three-layer convolution and the camera parameter, three-layer MLP is performed as indicated by the reference sign R4. An error is generated between a predicted confidence level and a teaching signal, and this error is fed back to the three-layer convolution and three-layer MLP. As indicated by the reference sign R5, as the data number to be processed is increased, the precision is more improved to lessen the error.

Figure 22:
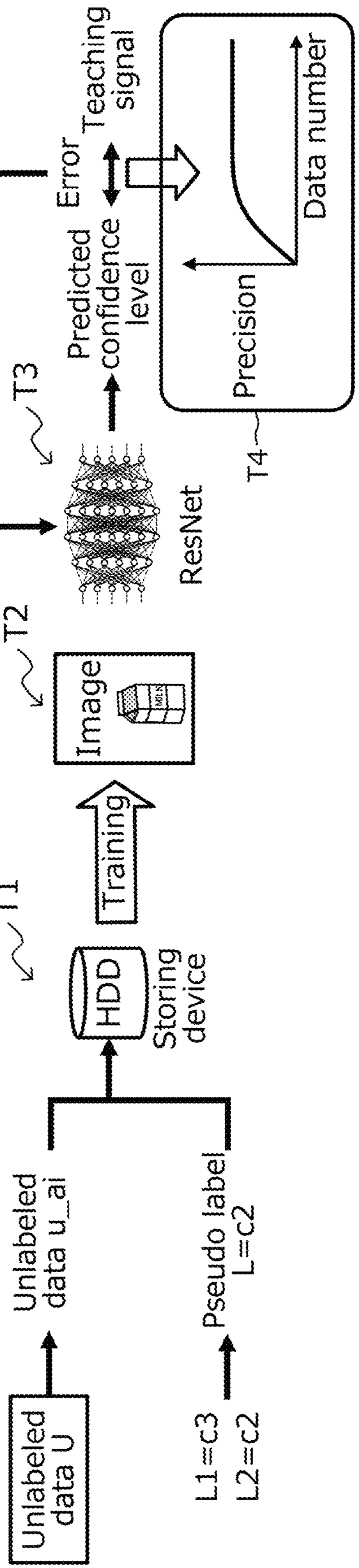
FIG. 22 is a diagram illustrating an example of training of the first product classifying model of the embodiment.

FIG. 22 is a diagram illustrating an example of training of the first product classifying model of the embodiment.

If an L2 label is provided, L=L2 is set, and otherwise, L=L1 is set. After that, data u_al and the label L estimated by the active learning are added, as training data, to the second dataset. The label learning unit 115 trains a model using the second dataset. The training of the model may be carried out at any timing. The training may be carried out every time datasets reaches a defined number (e.g., 100 datasets are gathered). The precision is gradually improved as data gathers.

In example of FIG. 22, as indicated by the reference sign T1, u_al is stored as unlabeled data U in the storage device such as the HDD 140, and L=c2 is stored as the pseudo label in the storage device such as the HDD 140 because the L2 label is given as c2. The u_al and c2 are used for training. When an image is inputted as indicated by the reference sign T2, ResNet is performed as indicated by the reference sign T3. An error is generated between a predicted confidence level and a teaching signal, and this error is fed back to the ResNet. As indicated by the reference sign T4, as the data number to be processed is increased, the precision is more improved to lessen the error.

Figure 23:
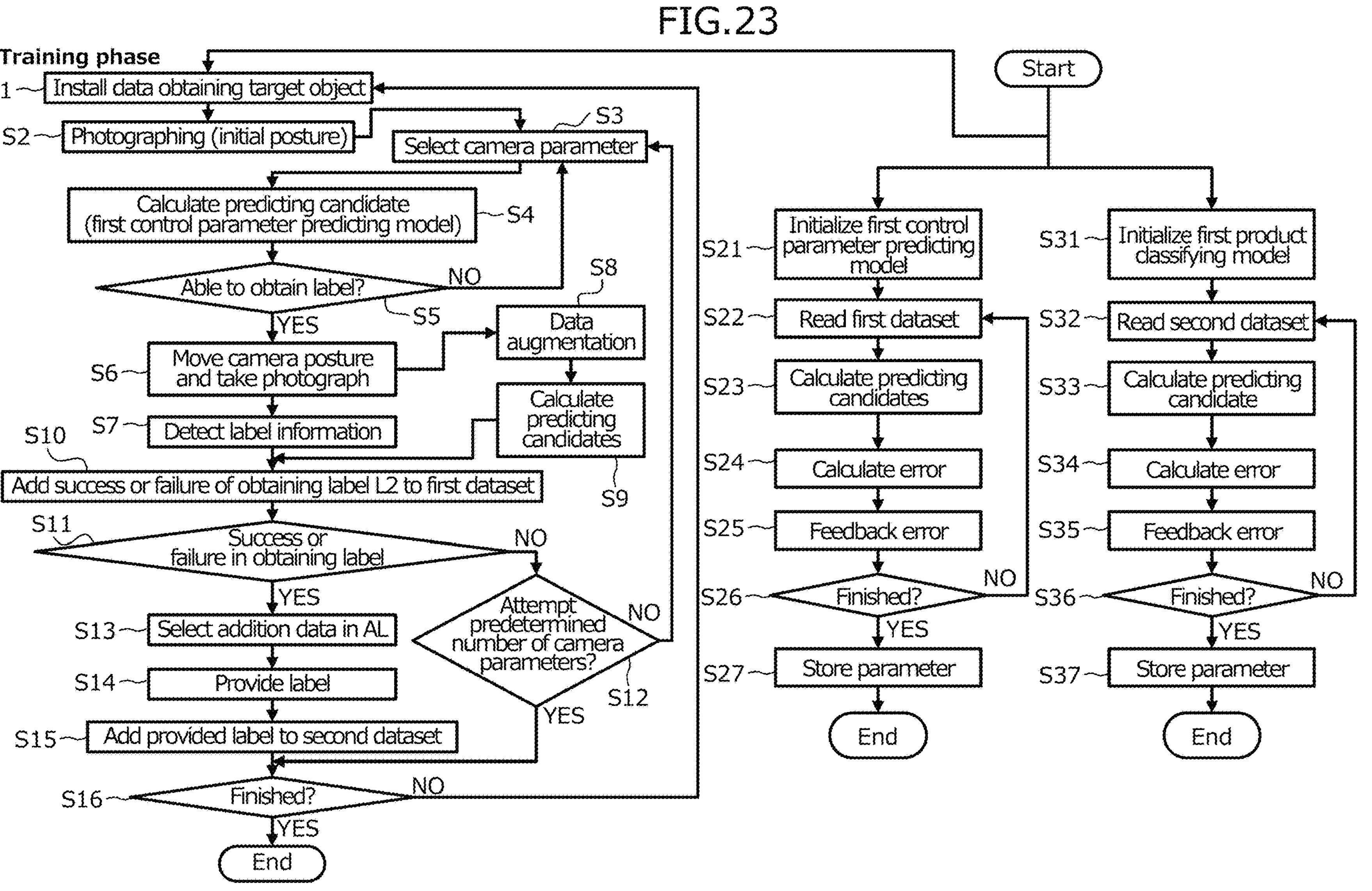
FIG. 23 is a flow chart illustrating a data obtaining process according to the embodiment.

(A-2) Operation:

Description will now be made in relation to a training process of a machine learning model according to the embodiment with reference to a flow chart (Steps S1-S16, S21-S27, S31-S37) of FIG. 23.

A data obtaining target object is installed (Step S1).

The data obtaining target object is photographed by the camera 161 in the initial posture (Step S2).

A camera parameter is selected (Step S3).

Predicting candidates are calculated using the first control parameter predicting model (Step S4).

It is determined whether a label is able to be obtained (Step S5).

If the label is unable be obtained (see NO route of Step S5), the process returns to Step S3.

On the other hand, if the label is able be obtained (see YES route of Step S5), the posture of the camera 161 is moved and then the camera 161 photographs the data obtaining target object (Step S6).

The label information is detected (Step S7).

In parallel with the process of Steps S6 and S7, the process of the following Steps S8 and S9 is performed.

A data augmentation process of a label is performed (Step S8).

Label predicting candidates are calculated (Step S9).

The success or failure in obtaining the label L2 is added to the first dataset (Step S10).

Determination is made as to whether or not the label has been successfully obtained (Step S11).

If the label is not obtained (see NO route of Step S11), it is determined whether a predetermined number of camera parameters are attempted (Step S12).

If the predetermined number of camera parameters are not attempted (see NO route of Step S12), the process returns to Step S3.

On the other hand, if the predetermined number of camera parameters are attempted (see YES route of Step S12), the process returns to Step S16.

If the label is successfully obtained in Step S11 (see YES route of Step S11), addition data is selected in the active learning (AL) (Step S13).

A label is provided (Step S14).

The provide label is added to the second dataset (Step S15).

It is determined whether the process has been completed on all data obtaining target objects (Step S16).

If a data obtaining target object not completing the process is present (see NO route of Step S16), the process returns to Step S1.

On the other hand, if all the data obtaining target objects completed the process (see YES route of Step S16), the training process of the machine learning model ends.

In parallel with the process of Steps S1-S16, the following process of Steps S21-S27 is performed.

The first control parameter predicting model is initialized (Step S21).

The first dataset is read (Step S22).

Predicting candidates are calculated (Step S23).

The error between a predicted confidence level and a teaching signal is calculated (Step S24).

The error is fed back (Step S25).

It is determined whether the process on the first dataset is completed (Step S26).

If the process on the first dataset is not completed (see NO route of Step S26), the process returns to Step S22.

On the other hand, if the process on the first dataset is completed (refer to YES route of Step S26), the parameter is stored (Step S27). Then, the training process of the machine learning model ends.

In parallel with the process of Steps S1-S16, the following process of Step S31-S37 is performed.

The first product classifying model is initialized (Step S31).

The second dataset is read (Step S32).

Predicting candidates are calculated (Step S33).

The error between a predicted confidence level and a teaching signal is calculated (step S34).

The error is fed back (Step S35).

It is determined whether the process on the second dataset is completed (Step S36).

If the process on the second dataset is not completed (see NO route of Step S36), the process returns to Step S32.

On the other hand, if the process on the second dataset is completed (refer to YES route of Step S36), the parameter is stored (Step S37). Then, the training process of the machine learning model ends.

Figure 24:
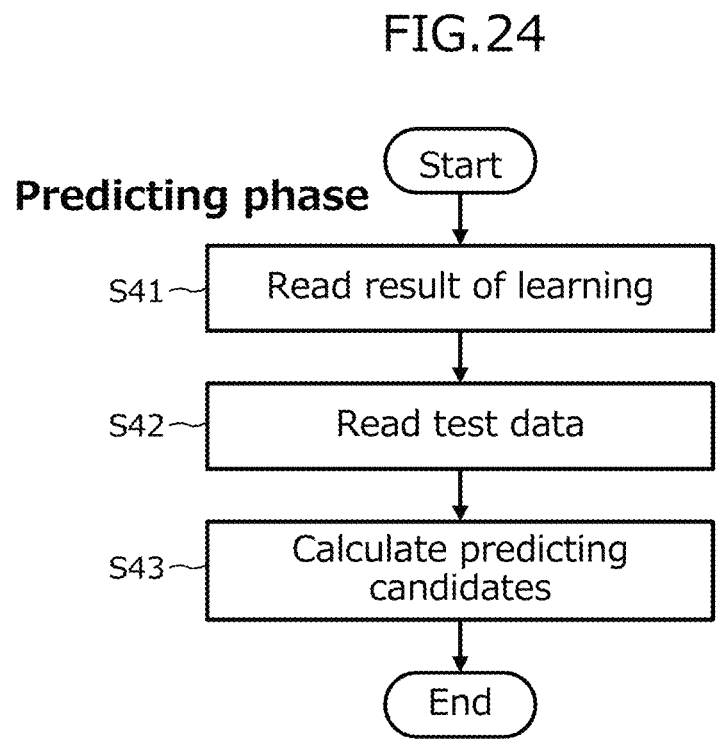

Next, description will now be made in relation to a predicting process of test data according to the embodiment with reference to the flow chart (Steps S41-S43) of FIG. 24.

The result of learning is read (Step S41).

Test data is read (Step S42).

Using the learning model, prediction candidates are calculated (Step S43). Then, the process of predicting the test data ends.

(B) Effects

The data gathering program, the data gathering apparatus 1, and the method of gathering data according to the above embodiment can achieve the following effects, for example.

The data gathering program performs data augmentation on unlabeled data and provides a particular label to a group of augmented data pieces generated by the data augmentation, the particular label indicating that labels of the augmented data pieces all match. Then, when a label for one data piece of the augmented data pieces is determined, the data gathering program provides the label to one or more data pieces each provided with a particular label that is same as a particular label of the one data piece.

This can reduce the human cost for labeling a dataset of a machine learning model.

Specifically, correct labels can be provided to data, which the conventional method has been unable to automatically label. By using a weak label that represents that labels of augmented data pieces all match, a label provided to data having a high confidence level can be treated as a label of entire unlabeled data. This efficiently uses time for automatic labeling. By including parameters for controlling the data obtainer when weak-labeled data is to be obtained in the target of learning, the time for labeling (i.e., the time for entire learning) can be shortened.

(C) Miscellaneous

The technique disclosed herein should by no means be limited to the foregoing embodiment and may be variously modified without departing from the scope of the present embodiment. The configurations and the processes of the present embodiment may be selected, omitted, or appropriately combined.

As one aspect, it is possible to reduce the human cost for labeling a dataset of a machine learning model.

Throughout the descriptions, the indefinite article "a" or "an", or adjective "one" does not exclude a plurality.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A non-transitory computer-readable recording medium storing a gathering program that causes one or more computers to execute a process, the process comprising:

performing, by a trained feature extraction model, data augmentation on unlabeled data being read from a storing device;

providing a first label to a group of augmented data generated by the data augmentation, the first label indicating that labels of the augmented data all match;

providing, when a label for one of data of the augmented data is determined, the label to one or more data each provided with the first label that is same as the first label of the one of data; and controlling, based on a control parameter predicted by a machine learning model, a position and a posture of a data obtainer that obtains training data such that a possibility that the label or the first label is successfully provided becomes highest, wherein the controlling comprises:

obtaining, by the data obtainer, an initial image in an initial posture;

preparing a plurality of candidate postures each represented by a posture parameter;

for each candidate posture, inputting the initial image and the posture parameter of the candidate posture into the machine learning model to output a predicted confidence level indicating whether label information is obtainable in the candidate posture;

identifying, based on the predicted confidence levels for the plurality of candidate postures, a candidate posture having a highest predicted confidence level; and controlling the data obtainer to move from the initial posture toward the identified candidate posture while continuously obtaining a plurality of images as the training data.

2. The non-transitory computer-readable recording medium according to claim 1, wherein the data obtainer is a camera.

3. The non-transitory computer-readable recording medium according to claim 1, wherein the data obtainer is a touch sensor.

4. A data gathering apparatus comprising:

a memory; and a processor coupled to the memory, the processor being configured to perform, by a trained feature extraction model, data augmentation on unlabeled data being read from a storing device;

provide a first label to a group of augmented data generated by the data augmentation, the first label indicating that labels of the augmented data all match;

provide, when a label for one of data of the augmented data is determined, the label to one or more data each provided with the first label that is same as the first label of the one of data; and control, based on a control parameter predicted by a machine learning model, a position and a posture of a data obtainer that obtains training data such that a possibility that the label or the first label is successfully provided becomes highest by obtaining, by the data obtainer, an initial image in an initial posture;

preparing a plurality of candidate postures each represented by a posture parameter;

for each candidate posture, inputting the initial image and the posture parameter of the candidate posture into the machine learning model to output a predicted confidence level indicating whether label information is obtainable in the candidate posture;

identifying, based on the predicted confidence levels for the plurality of candidate postures, a candidate posture having a highest predicted confidence level; and controlling the data obtainer to move from the initial posture toward the identified candidate posture while continuously obtaining a plurality of images as the training data.

5. The data gathering apparatus according to claim 4, wherein the data obtainer is a camera.

6. The data gathering apparatus according to claim 4, wherein the data obtainer is a touch sensor.

7. A computer-implemented method for gathering data comprising:

performing, by a trained feature extraction model, data augmentation on unlabeled data being read from a storing device;

providing a first label to a group of augmented data generated by the data augmentation, the first label indicating that labels of the augmented data all match;

providing, when a label for one of data of the augmented data is determined, the label to one or more data each provided with the first label that is same as the first label of the one of data; and controlling, based on a control parameter predicted by a machine learning model, a position and a posture of a data obtainer that obtains training data such that a possibility that the label or the first label is successfully provided becomes highest, wherein the controlling comprises:

obtaining, by the data obtainer, an initial image in an initial posture;

preparing a plurality of candidate postures each represented by a posture parameter;

for each candidate posture, inputting the initial image and the posture parameter of the candidate posture into the machine learning model to output a predicted confidence level indicating whether label information is obtainable in the candidate posture;

identifying, based on the predicted confidence levels for the plurality of candidate postures, a candidate posture having a highest predicted confidence level; and controlling the data obtainer to move from the initial posture toward the identified candidate posture while continuously obtaining a plurality of images as the training data.

8. The computer-implemented method for gathering data according to claim 7, wherein the data obtainer is a camera.

9. The computer-implemented method for gathering data according to claim 7, wherein the data obtainer is a touch sensor.

* * * * *